US012334655B2

(12) United States Patent
Wang et al.

(10) Patent No.: US 12,334,655 B2
(45) Date of Patent: Jun. 17, 2025

(54) ANTENNA AND ELECTRONIC DEVICE

(71) Applicants: Beijing BOE Technology Development Co., Ltd., Beijing (CN); BOE TECHNOLOGY GROUP CO., LTD., Beijing (CN)

(72) Inventors: Xiyuan Wang, Beijing (CN); Feng Qu, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/028,716

(22) PCT Filed: Apr. 29, 2022

(86) PCT No.: PCT/CN2022/090104
§ 371 (c)(1),
(2) Date: Mar. 27, 2023

(87) PCT Pub. No.: WO2023/206310
PCT Pub. Date: Nov. 2, 2023

(65) Prior Publication Data

US 2024/0364012 A1 Oct. 31, 2024

(51) Int. Cl.
*H01Q 9/04* (2006.01)
*H01Q 1/02* (2006.01)
*H01Q 3/36* (2006.01)

(52) U.S. Cl.
CPC ............ *H01Q 9/0442* (2013.01); *H01Q 1/02* (2013.01); *H01Q 3/36* (2013.01)

(58) Field of Classification Search
CPC .......... H01Q 9/0442; H01Q 3/36; H01Q 1/00; H01P 1/18
See application file for complete search history.

(56) References Cited

U.S. PATENT DOCUMENTS

| | | | | |
|---|---|---|---|---|
| 2009/0073332 A1* | 3/2009 | Irie | ........................ | C09K 19/22 349/20 |
| 2016/0141754 A1* | 5/2016 | Leyh | ........................ | H01Q 13/28 342/372 |

FOREIGN PATENT DOCUMENTS

| | | | | |
|---|---|---|---|---|
| CN | 105739211 A | 7/2016 | | |
| CN | 106154603 A | 11/2016 | | |
| CN | 107394318 A | 11/2017 | | |
| CN | 108493592 A | 9/2018 | | |
| CN | 109648971 A | 4/2019 | | |
| CN | 110137636 A * | 8/2019 | ........... | G02F 1/1313 |
| CN | 112886251 A | 6/2021 | | |
| CN | 113659342 A | 11/2021 | | |

(Continued)

*Primary Examiner* — Dieu Hien T Duong
(74) *Attorney, Agent, or Firm* — HOUTTEMAN LAW LLC

(57) ABSTRACT

The present disclosure provides an antenna and electronic device, and belongs to the field of communication technology. The antenna includes a feed layer, a phase adjustment layer, and a radiation layer, wherein the feed layer is configured to transmit a microwave signal to the phase adjustment layer; the phase adjustment layer is configured to phase-shift the microwave signal by a preset phase shift amount; and the radiation layer is configured to radiate the microwave signal phase-shifted by the phase adjustment layer; the radiation layer includes at least one first radiation patch.

16 Claims, 6 Drawing Sheets

(56) References Cited

FOREIGN PATENT DOCUMENTS

| | | | |
|---|---|---|---|
| CN | 113871864 | A | 12/2021 |
| CN | 215578989 | U | 1/2022 |
| CN | 114335932 | A | 4/2022 |
| JP | UP 2020191625 | A | 11/2020 |

* cited by examiner

ANTENNA AND ELECTRONIC DEVICE

TECHNICAL FIELD

The present disclosure relates to the field of antenna technology, and in particular to an antenna and an electronic device.

BACKGROUND

In some antennas, a dielectric constant of a dielectric layer of a phase shifter in an antenna may change greatly with a change of temperature. That is, an increased temperature may cause a narrowed range of a phase shift angle and an increased insertion loss of the phase shifter, which may cause the deteriorated performance of the antenna, such as lifting of a side lobe, lowering of a main lobe, a disturbance of a beam pointing, etc., and bring great challenges to the simulation design and the actual use of the antenna.

SUMMARY

The present invention is directed to at least one of the technical problems in the prior art, and provides an antenna and an electronic device.

In a first aspect, an embodiment of the present disclosure provides an antenna, including a feed layer, a phase adjustment layer, and a radiation layer, wherein the feed layer is configured to transmit a microwave signal to the phase adjustment layer; the phase adjustment layer is configured to phase-shift the microwave signal by a preset phase shift amount; and the radiation layer is configured to radiate the microwave signal phase-shifted by the phase adjustment layer; the radiation layer includes at least one first radiation patch.

In some embodiments, the first radiation patch includes first and second sides opposite to each other in a first direction, and third and fourth sides opposite to each other in a second direction; the first radiation patch further includes a fifth side; the fifth side is connected in at least one of the following manners: between a first end of the first side and a first end of the third side; between a second end of the first side and a first end of the fourth side; between a first end of the second side and a second end of the third side; and between a second end of the second side and a second end of the fourth side.

In some embodiments, the fifth side is connected between the first end of the first side and the first end of the third side, an intersection point of an extension line of the first side and an extension line of the third side is a first intersection point, and a distance from the first intersection point to the first end of the first side is equal to a distance from the first intersection point to the first end of the third side; or the fifth side is connected between the second end of the first side and the first end of the fourth side, an intersection point of an extension line of the first side and an extension line of the fourth side is a second intersection point, and a distance from the second intersection point to the second end of the first side is equal to a distance from the second intersection point to the first end of the fourth side; or the fifth side is connected between the first end of the second side and the second end of the third side, an intersection point of an extension line of the second side and an extension line of the third side is a third intersection point, and a distance from the third intersection point to the first end of the second side is equal to a distance from the third intersection point to the second end of the third side; or the fifth side is connected between the second end of the second side and the second end of the fourth side, an intersection point of an extension line of the second side and an extension line of the fourth side is a fourth intersection point, and a distance from the fourth intersection point to the second end of the second side is equal to a distance from the fourth intersection point to the second end of the fourth side.

In some embodiments, the phase adjustment layer includes at least one phase shifter, a first transmission end of each phase shifter is electrically connected to a second feed port of the feed layer; a second transmission end of each phase shifter is electrically connected to one first radiation patch; and the radiation layer further includes a first dielectric substrate and at least one probe, and first radiation layers are arranged on a side of the first dielectric substrate away from the phase adjustment layer; each probe is electrically connected to the corresponding first radiation layer, and penetrates through the first dielectric substrate and points to the second transmission end of the corresponding phase shifter.

In some embodiments, the first radiation patch includes first and second sides opposite to each other in a first direction, and third and fourth sides opposite to each other in a second direction; a center of a virtual quadrangle defined by extension lines of the first side, the second side, the third side and the fourth side is a first center, and a connection node of each probe and the first radiation patch is a first node; the first node and the first center has a first distance therebetween.

In some embodiments, an extending direction of a line connecting the first node and the first center is the second direction.

In some embodiments, the antenna further includes a first reference electrode layer between the first dielectric substrate and the phase adjustment layer; wherein the first reference electrode layer is provided with a plurality of first openings, and the probes are in one-to-one correspondence with the first openings.

In some embodiments, the phase adjustment layer includes at least one phase shifter, each phase shifter includes a first substrate and a second substrate opposite to each other, and a tunable dielectric layer between the first substrate and the second substrate; a temperature control unit layer is arranged on a side of at least one of the first substrate and the second substrate away from the tunable dielectric layer; the temperature control unit layer is configured to adjust a temperature of the phase adjustment layer to adjust an operating temperature of the antenna.

In some embodiments, a plurality of flow channels are provided in the temperature control unit layer for accommodating a flow of an operating medium.

In some embodiments, the antenna further includes: a circulation device connected to the plurality of flow channels; wherein the circulation device includes an operating medium driving unit and an operating medium temperature control unit, wherein the operating medium driving unit is configured to drive the operating medium to flow, and the operating medium temperature control unit is configured to control an temperature of the operating medium.

In some embodiments, the feed layer includes a waveguide power division feed network; the temperature control unit layer on a side of the first substrate away from the tunable dielectric layer is in the same layer as the waveguide power division feed network, and orthographic projections of the temperature control unit layer and the waveguide power division feed network on the first dielectric substrate do not overlap with each other.

In some embodiments, the temperature control unit layer includes an electric heating sheet and/or a semiconductor refrigeration sheet.

In some embodiments, the antenna further includes a plurality of temperature measurement units on a side of the first substrate and/or the second substrate of at least a part of the at least one phase shifter away from the tunable dielectric layer, and configured to detect an operating temperature of the at least one phase shifter.

In some embodiments, the antenna includes a housing including at least a first side plate and a second side plate opposite to each other; a first wind control device is provided on the first side plate, and a second wind control device is provided on the second side plate; the first wind control device is configured to direct ambient air into the interior of the housing and the second wind control device is configured to direct air from the interior of the housing out of the housing.

In some embodiments, the antenna includes a housing, a temperature control layer is on an outer wall of the housing.

In a second aspect, an embodiment of the present disclosure provides an electronic device, including the antenna of any one of the above embodiments.

DETAIL DESCRIPTION OF EMBODIMENTS

In order to enable one of ordinary skill in the art to better understand the technical solutions of the present disclosure, the present invention will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Figure 1:
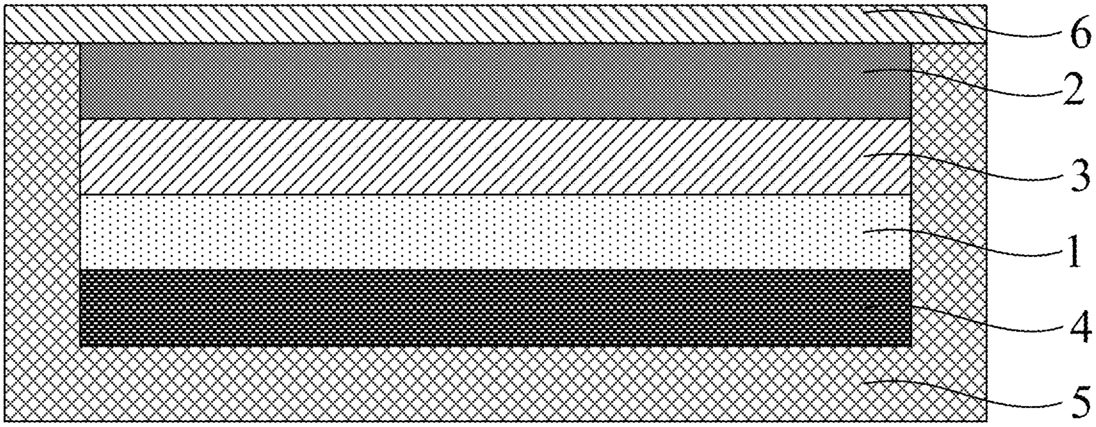
FIG. 1 is a schematic diagram of a structure of an antenna according to an embodiment of the present disclosure.

In a first aspect, FIG. 1 is a schematic diagram of a structure of an antenna according to an embodiment of the present disclosure. As shown in FIG. 1, an embodiment of the present disclosure provides an antenna, including a feed layer 1, a phase adjustment layer 3, and a radiation layer 2. The feed layer 1 is configured to transmit a microwave signal to the phase adjustment layer; the phase adjustment layer 3 is configured to phase-shift the microwave signal by a preset phase shift amount; the radiation layer 2 is configured to radiate the microwave signal phase-shifted by the phase adjustment layer 3; the radiation layer includes at least one first radiation patch.

The antenna provided in the embodiment of the present disclosure is a passive antenna structure, which does not include a device capable of amplifying a radio frequency signal, so that the key of the passive antenna is to reduce a loss, including a loss of an antenna array, a loss of a phase shifter, and reduce a loss of a feed layer.

In order to clarify the structure of the antenna in the embodiments of the present disclosure, each part of the antenna is described below.

The phase shifter in the antenna of the embodiment of the present disclosure may be a liquid crystal phase shifter, that is, a liquid crystal layer is used as a tunable dielectric layer in the phase shifter. Specifically, the phase shifter in the embodiments of the present disclosure includes, but is not limited to, an inverted micro-strip type, an upright micro-strip type, a coplanar waveguide transmission line type, a variable capacitance type, or the like. As an example, the phase shifter adopts the inverted micro-strip type.

Figure 2:
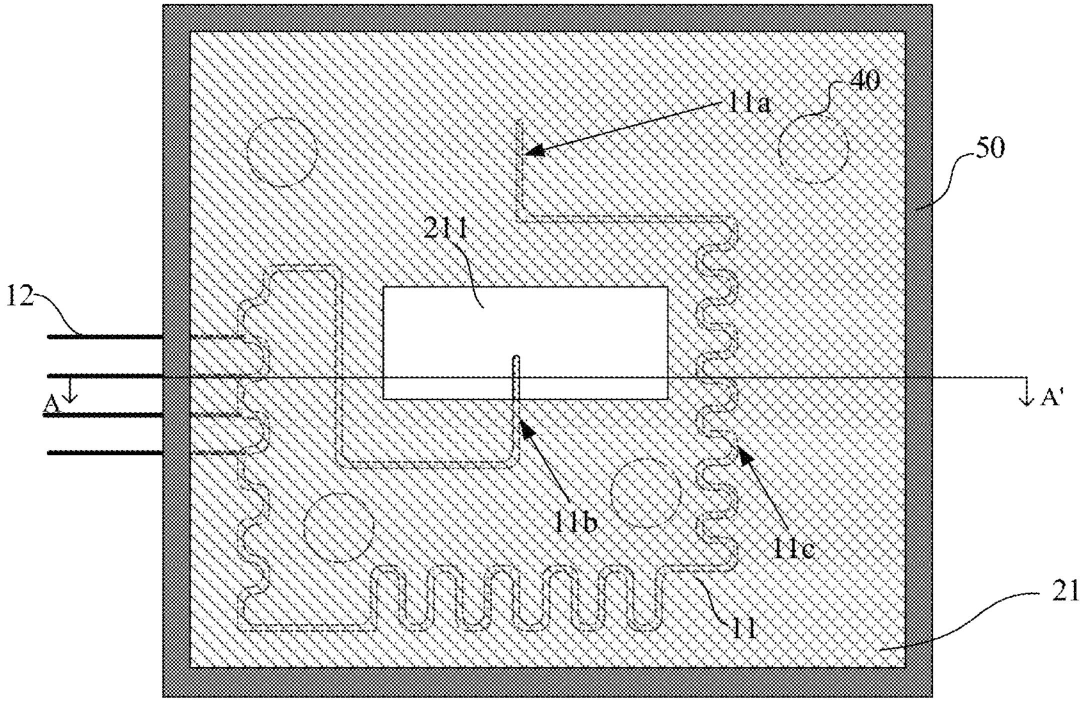
FIG. 2 is a top view of an inverted micro-strip type phase shifter.
Figure 3:
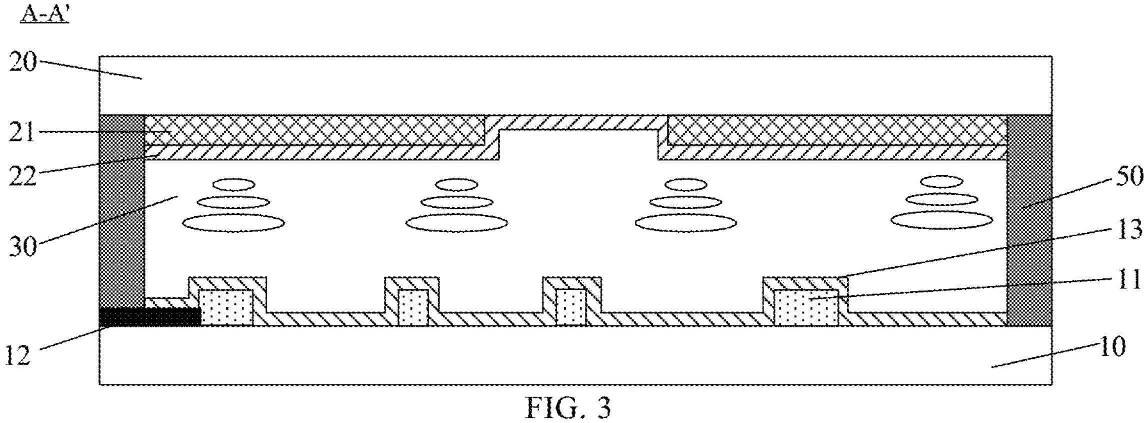
FIG. 3 is a cross-sectional view taken along a line A-A' of FIG. 2.

FIG. 2 is a top view of an inverted micro-strip type phase shifter. FIG. 3 is a cross-sectional view taken along a line A-A' of FIG. 2. As shown in FIGS. 2 and 3, the phase shifter includes first and second substrates disposed opposite to each other, and a liquid crystal layer 30 disposed between the first and second substrates. The first substrate includes a second dielectric substrate 10, a first transmission line 11 and a bias line 12 arranged on a side of the second dielectric substrate 10 close to the liquid crystal layer 30, and a first alignment layer 13 arranged on a side of the first transmission line 11 and the bias line 12 away from the second dielectric substrate 10. The second substrate includes a third dielectric substrate 20, a second reference electrode 21 arranged on a side of the third dielectric substrate 20 close to the liquid crystal layer 30, and a second alignment layer 22 arranged on a side of the second reference electrode 21 close to the liquid crystal layer 30. Alternatively, as shown in FIG. 2, the phase shifter includes not only the above structure, but also support structures 40 for maintaining a cell gap of a liquid crystal cell (a cell gap between the first substrate and the second substrate), a sealant 50 for sealing the liquid crystal cell, and other structures, which are not described herein. As shown in FIG. 2, the first transmission line 11 has a first transmission end 11*a* (serving as a first transmission end of a phase shifter), a second transmission end 11*b* (serving as a second transmission end of a phase shifter), and a transmission body portion 11*c*; wherein the first transmission end 11*a*, the second transmission end 11*b* and the transmission body portion 11*c* all have a first end point and a second end point; the first end point of the first transmission end 11*a* and the first end point of the transmission body portion 11*c* are electrically connected to each other, and the first end point of the second transmission end 11*b* and the second end point of the transmission body portion 11*c* are electrically connected to each other. It should be noted that the first end point and the second end point are described relative to each other, if the first end point is the head end, the second end point is the tail end, and vice versa. In addition, in the embodiment of the present disclosure, the first end point of the first transmission end 11*a* and the first end point of the transmission body portion 11*c* are electrically connected to each other, and at this time, the first end point of the first transmission end 11*a* and the first end point of the transmission body portion 11*c* may be a common end point. Accordingly, the first end point of the second transmission end 11*b* and the second end point of the transmission body portion 11*c* are electrically connected to each other, and the first end point of the second transmission end 11*b* and the second end point of the transmission body portion 11*c* are a common end point.

The transmission body portion 11*c* includes, but is not limited to, one or more meandering lines. A shape of the meandering line includes, but is not limited to, a bow, a wave, or the like.

In some examples, when the transmission body portion 11*c* includes a plurality of meandering lines, at least a part of which have different shapes. That is, some of the plurality of meandering lines may have the same shape, or all the meandering lines may have different shapes.

In some examples, when the transmission body portion 11*c* of the first transmission line 11 includes at least one meandering line, an orthographic projection of an second opening 211 of the second reference electrode 21 on the second dielectric substrate 10 does not overlap with an orthographic projection of the at least one meandering line on the second dielectric substrate 10. For example: the orthographic projection of the second opening 211 of the second reference electrode 21 on the second dielectric substrate 10 does not overlap with an orthographic projection of each meandering line on the second dielectric substrate 10, thereby avoiding loss of the microwave signal.

In some examples, when the first transmission end 11*a* serves as a receiving end for the microwave signal, the second transmission end 11*b* serves as a transmitting end for the microwave signal; accordingly, when the second transmission end 11*b* serves as a receiving end for the microwave signal, the first transmission end 11*a* serves as a transmitting end for the microwave signal. The bias line 12 is electrically connected to the first transmission line 11 and configured to apply a direct current bias signal to the first transmission line 11, so that a direct current steady-state electric field is formed between the first transmission line 11 and the second reference electrode 21. Microscopically, the liquid crystal molecules in the liquid crystal layer 30 are subjected to an electric field force, and the axis orientation is rotated. That is, macroscopically, a dielectric constant of the liquid crystal layer 30 is changed, when a microwave signal is transmitted between the first transmission line 11 and the second reference electrode 21, the dielectric constant of the liquid crystal layer 30 is changed so that the phase of the microwave signal is changed accordingly. Specifically, the phase variation of the microwave signal is positively correlated with a rotating angle of the liquid crystal molecules and strength of an electric field, i.e., the phase of the microwave signal can be changed by applying a direct current bias voltage, which is an operating principle of the liquid crystal phase shifter. It should be noted that in the embodiments of the present disclosure, the phase shifter further includes a first wiring board and a second wiring board; the first wiring board is bonded to the first substrate and configured to supply a direct current bias voltage to the bias line 12. The second wiring board is bonded to the second substrate and configured to supply a ground signal to the second reference electrode 21. Each of the first wiring board and the second wiring board may include various types of wiring boards, such as a flexible printed circuit (FPC) or a printed circuit board (PCB), or the like, which is not limited here. The first wiring board may have at least one first connection pad thereon, one end of the bias line 12 is connected to (i.e., bonded to) the first connection pad, the other end of the bias line 12 is connected to the first transmission line 11; the second wiring board may also have at least one second connection pad thereon, and the second wiring board is electrically connected to the second reference electrode 21 through a second connection pad.

In some examples, with continued reference to FIG. 2, the phase shifter includes not only the above structure, but also a plurality of support structures 40, a frame sealing adhesive 50 and the like; the frame sealing adhesive 50 is arranged between the second dielectric substrate and the third dielectric substrate in the peripheral region, and surrounds a microwave transmission region, and is used for sealing the liquid crystal cell of the phase shifter; the plurality of support structures 40 are disposed between the second dielectric substrate and the third dielectric substrate, and are disposed at intervals in the microwave transmission region, to maintain the cell gap (height) of the liquid crystal cell.

In some examples, the bias line 12 is made of a high-resistance material, and when a direct current bias voltage is applied to the bias line 12, the electric field formed by the bias line and the second reference electrode 21 is only used to drive the liquid crystal molecules of the liquid crystal layer 30 to rotate, which is equivalent to an open circuit for the microwave signal transmitted by the phase shifter. That is, the microwave signal is transmitted only along the first transmission line 11. In some examples, a material of the bias line 12 includes, but is not limited to, any one of indium tin oxide (ITO), nickel (Ni), tantalum nitride (TaN), chromium (Cr), indium oxide ($In_2O_3$), and tin oxide ($Sn_2O_3$). Preferably, the bias line 12 is made of ITO.

In some examples, the first transmission line 11 is made of a metal material, and a material of the first transmission line 11 is not limited to aluminum, silver, gold, chromium, molybdenum, nickel, or iron or the like.

In some examples, the first transmission line 11 is a delay line, and a corner of the delay line is not equal to 90°, so as to prevent the microwave signal from being reflected at the corner of the delay line, and therefore, to avoid the loss of the microwave signal.

In some examples, the second dielectric substrate 10 may be made of a plurality of materials, for example, if the second dielectric substrate 10 is a flexible substrate, a material of the second dielectric substrate 10 may include at least one of polyethylene glycol terephthalate (PET) and polyimide (PI); and if the second dielectric substrate 1011 is a rigid substrate, a material of the second dielectric substrate 10 may also be glass, etc. A thickness of the second dielectric substrate 10 may be in a range from about 0.1 mm to 1.5 mm. The third dielectric substrate 20 may be made of various materials, for example, if the third dielectric substrate 20 is a flexible substrate, a material of the third dielectric substrate 20 may include at least one of polyethylene glycol terephthalate (PET) and polyimide (PI), and if the third dielectric substrate 20 is a rigid substrate, the material of the third dielectric substrate 20 may also be glass, etc. A thickness of the third dielectric substrate 20 may be about in a range from 0.1 mm to 1.5 mm. Alternatively, the second dielectric substrate 10 and the third dielectric substrate 20 may be made of other materials, which is not limited herein. The specific thicknesses of the second dielectric substrate 10 and the third dielectric substrate 20 may also be set according to the skin depth of electromagnetic waves (radio frequency signals).

The feed layer 1 in the embodiment of the present disclosure may include a micro-strip power division feed network or may adopt a waveguide power division feed network 4. In the embodiment of the present disclosure, as an example, the feed layer adopts a waveguide power division feed network.

Figure 4:
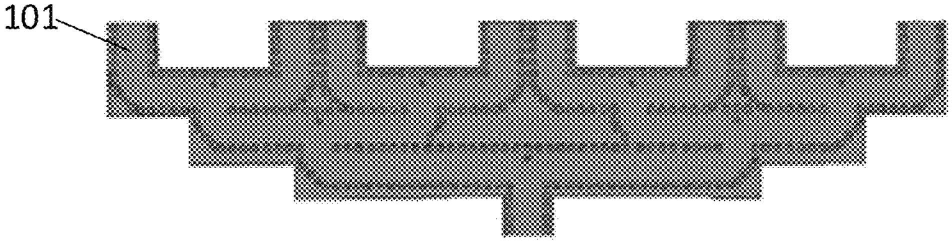
FIG. 4 is a schematic diagram of a waveguide power division feed network in the antenna according to an embodiment of the present disclosure.

Specifically, FIG. 4 is a schematic diagram of a waveguide power division feed network 4 in the antenna according to an embodiment of the present disclosure. As shown in FIG. 4, the waveguide power division feed network may have n stages of waveguide sub-structures 101. In a direction from the phase adjustment layer to the waveguide power division feed network, the n stages of waveguide sub-structures 101 are referred to as waveguide sub-structures 101 at a first stage to waveguide sub-structures 101 at an nth stage, and the number of waveguide sub-structures 101 in the n stages gradually decreases from the first stage to the nth stage; wherein n is an integer and $n \geq 2$.

When $n=2$, a first end (also referred to as a second feed port) of each waveguide sub-structure 101 at the first stage is connected to a corresponding phase shifter, and second ends of at least two waveguide sub-structures 101 at the first stage are connected to a first end of one waveguide sub-structure 101 at the second stage; a second end of each waveguide sub-structure 101 at the second stage serves as a combining end of the waveguide power division feed network.

When $n>2$, a first end (also referred to as a second feed port) of each waveguide sub-structure 101 at the first stage is connected to a corresponding phase shifter, and second ends of at least two waveguide sub-structures 101 at the first stage are connected to a first end of one waveguide sub-structure 101 at the second stage; a first end of each waveguide sub-structure 101 at the mth stage is connected to second ends of at least two waveguide sub-structures 101 at the (m−1)th stage, and second ends of at least two waveguide sub-structures 101 at the mth stage are connected to a first end of one waveguide sub-structure 101 at the (m+1)th stage; wherein m is an integer and $1<m<n$; a first end of each waveguide sub-structure 101 at the nth stage is connected to second ends of at least two waveguide sub-structures 101 at the (n−1)th stage, a second end of each waveguide sub-structure 101 at the nth stage serves as a combining end of the waveguide power division feed network.

That is to say, the waveguide power division feed network comprises multiple stages of waveguide sub-structure 101 for power division, multiple paths of microwave signals are combined from the 1st stage to the nth stage (the final stage) of waveguide sub-structures 101 stage by stage into an output of the waveguide power division structure. In some examples, a second end of the waveguide sub-structure 101 at the last stage is connected to a signal connector, for example, an SMA (subminiature) connector, and a port test connector may also be connected to the waveguide sub-structure 101 for testing.

Furthermore, the waveguide sub-structure 101 at the first stage and the phase shifter may specifically be: each waveguide sub-structure 101 at the first stage is coupled to the second transmission end 11*b*, as the output end, of the first transmission line 11 of the phase shifter. That is, each waveguide sub-structure 101 at the first stage is located on a side of the second substrate of one phase shifter away from the liquid crystal layer 30, and is configured to transmit the microwave signal in the coupling of the waveguide sub-structure 101 at the first stage with the second transmission end 11*b* (that is, the second end) of the first transmission line 11 through the second opening 211 in the second reference electrode 21. That is, an orthographic projection of each waveguide sub-structure 101 at the first stage on the second substrate at least partially overlaps with an orthographic projection of the second opening 211 of the second reference electrode 21 of the phase shifter corresponding to the waveguide sub-structure 101 on the second substrate.

Figure 5:
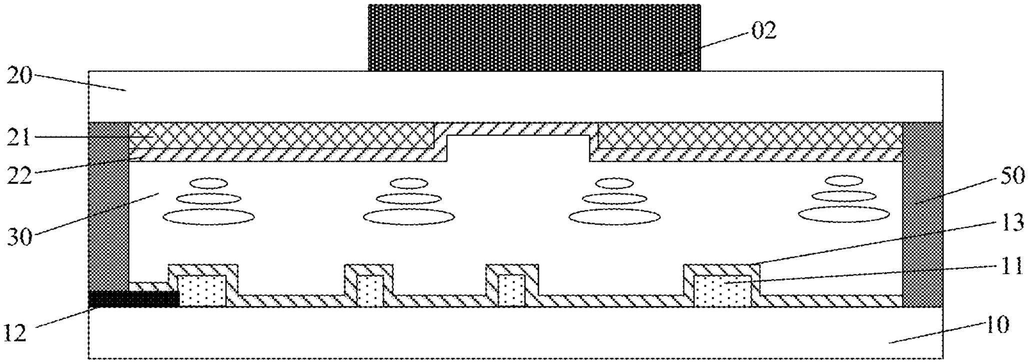
FIG. 5 is a schematic diagram of a combination of a radiation layer and a phase shifter according to an embodiment of the present disclosure.

FIG. 5 is a schematic diagram of a combination of a radiation layer and a phase shifter according to an embodiment of the present disclosure. As shown in FIG. 5, the radiation layer in the embodiment of the present disclosure includes a first radiation patch. An outline of the first radiation patch may be any shape such as a circle, a rectangle, a hexagon or an irregular shape. When the first radiation patch adopts different shapes, the radiation efficiency and the polarization direction for the microwave signal are different. An antenna including the first radiation patch 02 having different shapes will be described below with reference to several specific examples.

Figure 6:
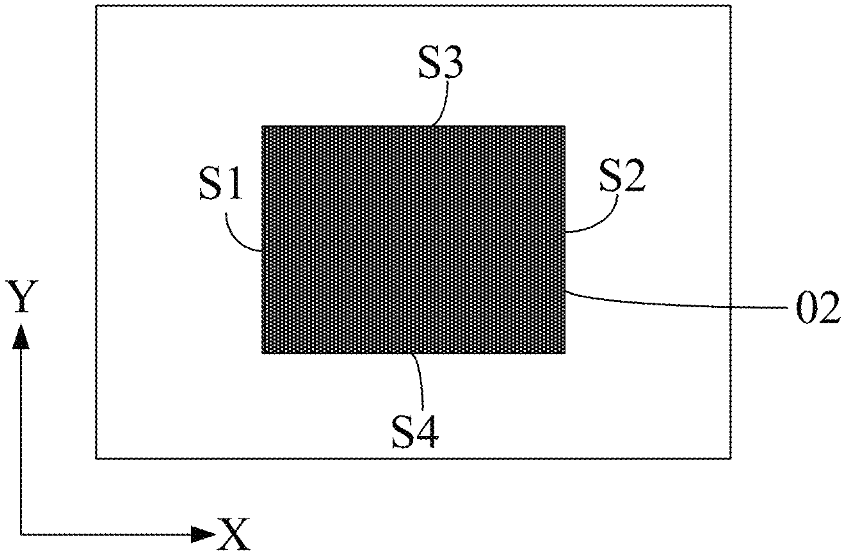
FIG. 6 is a top view of a first radiation patch according to a first example of an embodiment of the present disclosure.

In a first example, FIG. 6 is a top view of a first radiation patch 02 according to a first example of an embodiment of the present disclosure. As shown in FIG. 6, the outline of the first radiation patch 02 is a quadrangle. Specifically, the first radiation patch 02 includes a first side S1 and a second side S2 that are oppositely disposed along a first direction X, and a third side S3 and a fourth side S4 that are oppositely disposed along a second direction Y. When the first radiation patch 02 is designed to be linearly polarized, the polarization direction for the microwave signal is a direction along the first side S1 and the second side S2.

Figure 7:
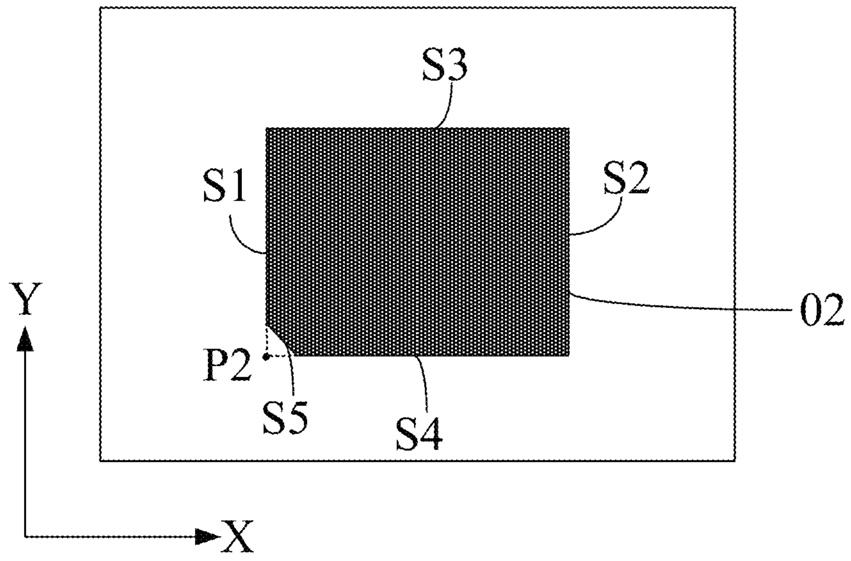
FIG. 7 is a top view of a first radiation patch according to a second example of an embodiment of the present disclosure.

In a second example, FIG. 7 is a top view of a first radiation patch 02 according to a second example of an embodiment of the present disclosure. As shown in FIG. 7, the first radiation patch 02 has a pentagonal outline and adopts a right-handed circular polarization design. Specifically, the first radiation patch 02 includes a first side S1 and a second side S2 that are oppositely disposed in the first direction X, a third side S3 and a fourth side S4 that are oppositely disposed in the second direction Y, and a fifth side S5 that connects a second end of the first side S1 and a first end of the fourth side S4 (or, is connected between the second end of the first side S1 and the first end of the fourth side S4). In one example, an intersection point of an extension line of the first side S1 and an extension line of the fourth side S4 is a second intersection point P2, and a distance from the second intersection point P2 to the second end of the first side S1 is equal to a distance from the second intersection point P2 to the first end of the fourth side S4. That is, the structure denoted by dotted lines in the figure is an isosceles right triangle.

Figure 8:
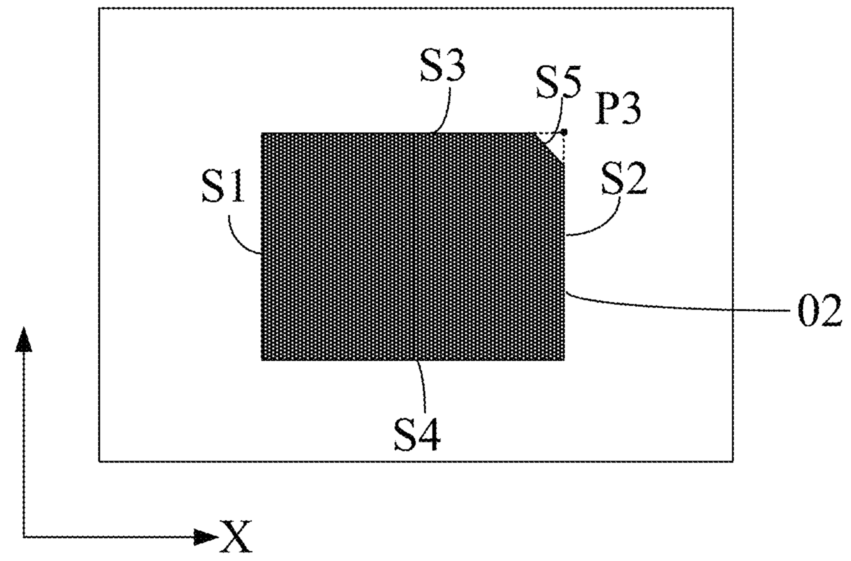
FIG. 8 is a top view of a first radiation patch according to a third example of an embodiment of the present disclosure.

In a third example, FIG. 8 is a top view of a first radiation patch 02 according to a third example of an embodiment of the present disclosure. As shown in FIG. 8, the first radiation patch 02 has a pentagonal outline and adopts a right-handed circular polarization design. Specifically, the first radiation patch 02 includes a first side S1 and a second side S2 that are oppositely disposed in the first direction X, a third side S3 and a fourth side S4 that are oppositely disposed in the second direction Y, and a fifth side S5 that connects a second end of the third side S3 and a first end of the second side S2. In one example, an intersection point of an extension line of the third side S3 and an extension line of the second side S2 is a third intersection point P3, and a distance from the third intersection point P3 to the first end of the second side S2 is equal to a distance from the third intersection point P3 to the second end of the third side S3. That is, the structure denoted by dotted lines in the figure is an isosceles right triangle.

Figure 9:
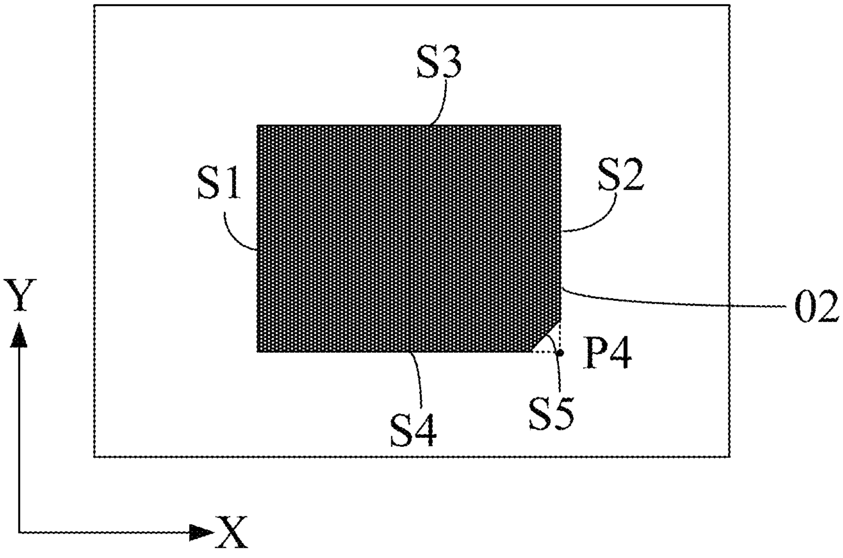
FIG. 9 is a top view of a first radiation patch according to a fourth example of an embodiment of the present disclosure.

In a fourth example, FIG. 9 is a top view of a first radiation patch 02 according to a fourth example of an embodiment of the present disclosure. As shown in FIG. 9, the first radiation patch 02 has a pentagonal outline and adopts a left-handed circular polarization design. Specifically, the first radiation patch 02 includes a first side S1 and a second side S2 that are oppositely disposed in the first direction X, a third side S3 and a fourth side S4 that are oppositely disposed in the second direction Y, and a fifth side S5 that connects a second end of the second side S2 and a second end of the fourth side S4. In one example, an intersection point of an extension line of the second side S2 and an extension line of the fourth side S4 is a fourth intersection point P4, and a distance from the fourth intersection point P4 to the second end of the second side S2 is equal to a distance from the fourth intersection point P4 to the second end of the fourth side S4. That is, the structure denoted by dotted lines in the figure is an isosceles right triangle.

Figure 10:
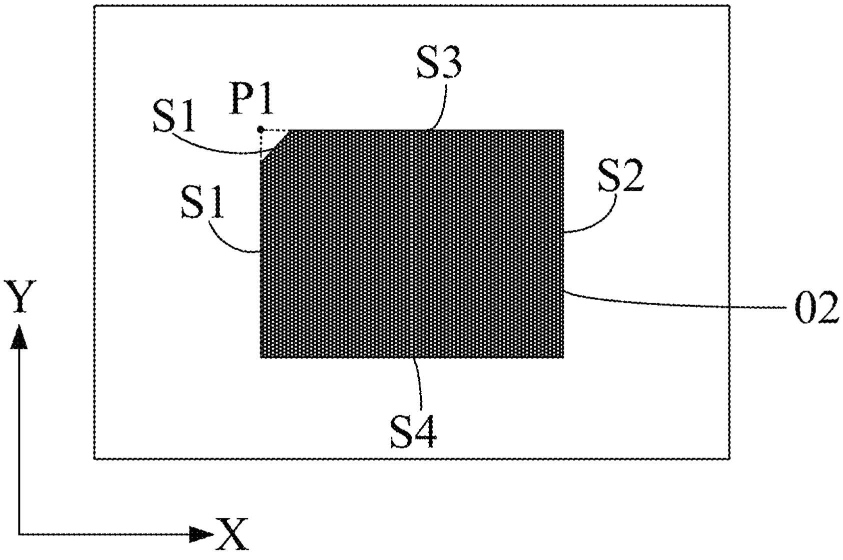
FIG. 10 is a top view of a first radiation patch according to a fifth example of an embodiment of the present disclosure.

In a fifth example, FIG. 10 is a top view of a first radiation patch 02 according to a fifth example of an embodiment of the present disclosure. As shown in FIG. 10, the first radiation patch 02 has a pentagonal outline and adopts a left-handed circular polarization design. Specifically, the first radiation patch 02 includes a first side S1 and a second side S2 that are oppositely disposed in the first direction X, a third side S3 and a fourth side S4 that are oppositely disposed in the second direction Y, and a fifth side S5 that connects a first end of the first side S1 and a first end of the third side S3. In one example, an intersection point of an extension line of the first side S1 and an extension line of the third side S3 is a first intersection point P1, and a distance from the first intersection point P1 to the first end of the first side S1 is equal to a distance from the first intersection point P1 to the first end of the third side S3. That is, the structure denoted by dotted lines in the figure is an isosceles right triangle.

Some exemplary structures of a part of the structure of the antenna shown in FIG. 1 are given as above. Alternatively, as shown in FIG. 1, the antenna may include not only the above structures, but also a housing 5, a power supply and a beam controlling system 4, and an antenna cover 6 and the like, which are not listed here.

Figure 11:
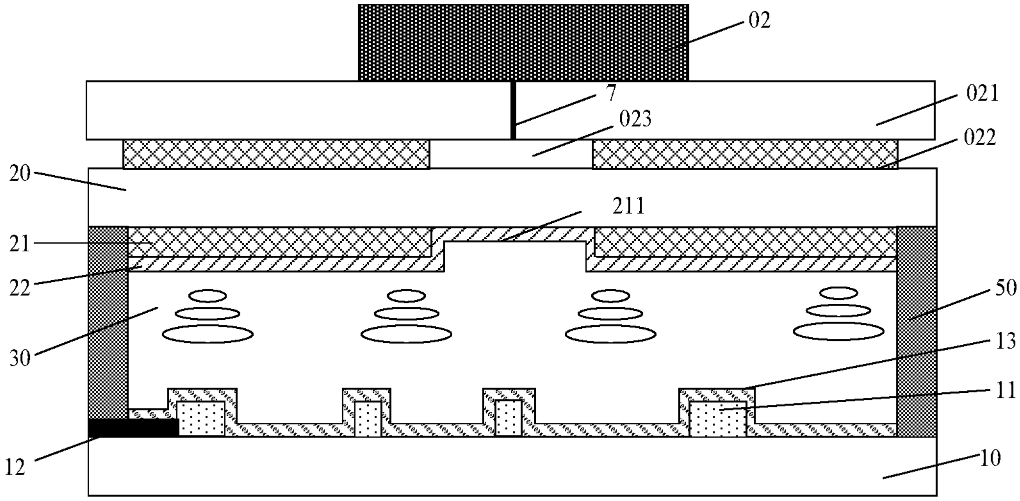
FIG. 11 is a schematic diagram of a part of a structure of an antenna according to an embodiment of the present disclosure.

FIG. 11 is a schematic diagram of a part of a structure of an antenna according to an embodiment of the present disclosure. As shown in FIG. 11, the embodiment of the present disclosure further provides an antenna having substantially the same structure as the antenna shown in FIG. 1, except that the antenna further includes a probe 7 electrically connected to the first radiation patch 02. The first radiation layer further includes a first dielectric substrate 021, the first radiation patch 02 is disposed on a side of the first dielectric substrate 021 away from the phase adjustment layer, and the probe 7 penetrates through the first dielectric substrate 021 and points to the second opening of the second reference electrode. In this case, the radio frequency signal propagates through space, is received by the first radiation patch 02, and then propagates downward by the probe 7 in the form of a radio frequency current, is converted into an electromagnetic wave at the end of the probe 7, and propagates to the phase shifter in a space coupling manner for phase-shifting.

In some examples, the probe 7 is made of copper, a diameter of the probe 7 is 20 um, and the probe 7 is coated with a layer of polytetrafluoroethylene having a thickness of 70 um. The first dielectric substrate 021 may be a printed circuit board (PCB).

In some examples, with continued reference to FIG. 11, a first reference electrode 022 may be further disposed on a side of the first dielectric substrate 021 close to the phase shifter, and a first opening 023 is disposed in the first reference electrode layer 022 at a position corresponding to the probe 7. Orthographic projections of one first opening 023 and one corresponding second opening 211 on the first dielectric substrate 021 overlap with each other. For example: the first openings 023 and the second openings 211 are arranged in a one-to-one correspondence.

Figure 12:
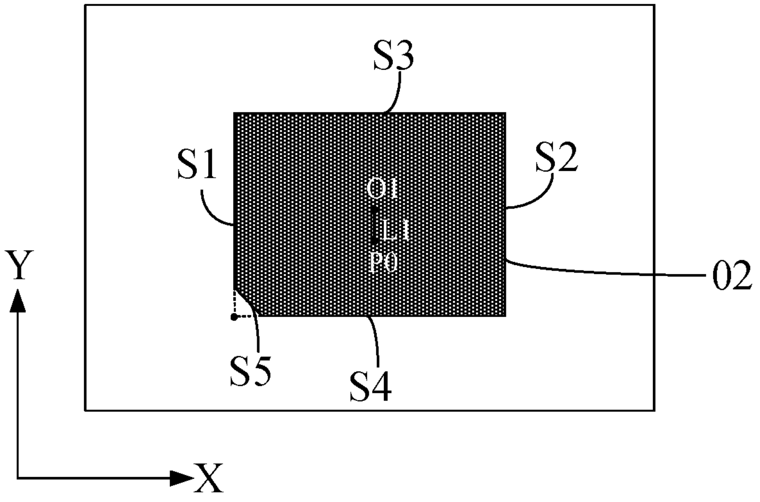
FIG. 12 is a schematic diagram showing a location where a first radiation patch is connected to a probe in the antenna of FIG. 11.

In some examples, FIG. 12 is a schematic diagram showing a location where a first radiation patch 02 is connected to a probe 7 in the antenna of FIG. 11. As shown in FIG. 12, no matter the first radiation patch 02 adopts any one of the first radiation patches 02 described above, a connection node of the probe 7 and the first radiation patch 02 is a first node P0; the center of a virtual quadrangle defined by the extension lines of the first side S1, the second side S2, the third side S3, and the fourth side S4 of the first radiation patch 02 is a first center O1. The first node P0 and the first center O1 have a certain first distance L1 therebetween. For example: the first distance L1 is about 1.59 mm. It should be noted that the probe 7 at different positions of the patch causes the antenna impedance to change. For example: an extending direction of a line connecting the first node P0 and the first center O1 is the second direction Y. That is, as shown in FIG. 12, the first node P0 shifts downward with respect to the first center O1 in the second direction Y.

The liquid crystal phase shifter utilizes the anisotropy of liquid crystal molecules, and the liquid crystal molecules rotate spatially along with the change of an applied external electric field, so that the equivalent dielectric constant and the equivalent loss tangent are changed, and the phase and the amplitude of electromagnetic waves are changed. By controlling a strength of the applied electric field (voltage magnitude), the phase can be accurately controlled. However, the dielectric constant and loss tangent of the liquid crystal molecules are functions of temperature, and change greatly along with the change of the temperature, so that the liquid crystal phase shifter has large temperature drift characteristics, which is not acceptable for a phased array antenna system. Therefore, the embodiment of the present disclosure further provides an antenna, which may include any one of the above antenna architectures, and on the basis of the above structure, a temperature control system is provided in the antenna. The following examples are specifically given for illustration.

Figure 13:
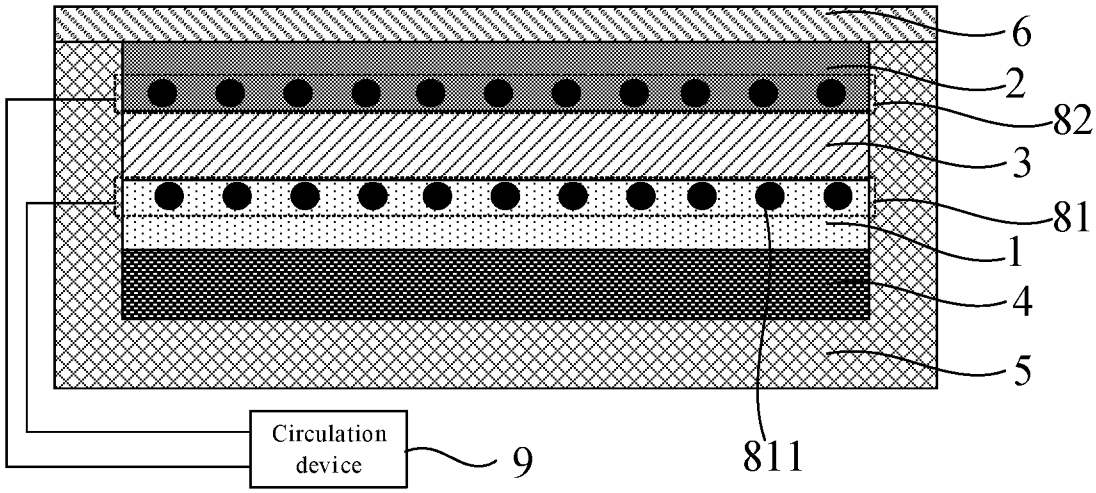
FIG. 13 is a schematic diagram of a structure of an antenna according to a first example according to an embodiment of the present disclosure.

In a first example, FIG. 13 is a schematic diagram of a structure of an antenna according to a first example according to an embodiment of the present disclosure. As shown in FIG. 13, a temperature control unit layer is disposed on a side of the phase adjustment layer of the antenna close to the radiation layer and/or the feed layer, and is configured to adjust a temperature of the phase adjustment layer to adjust an operating temperature of the antenna. FIG. 13 only shows an example that temperature control unit layers are disposed on a side of the phase adjustment layer close to the radiation layer and on a side of the phase adjustment layer close to the feed layer. For convenience of description, the temperature control unit layer on the side of the phase adjustment layer close to the radiation layer is a first temperature control unit layer 81, and the temperature control unit layer on the side of the phase adjustment layer close to the feed layer is a second temperature control unit layer 82.

In some examples, each of the first temperature control unit layer 81 and the second temperature control unit layer 82 may be provided with a plurality of flow channels 811 therein for accommodating the flowing operating medium. When the operating temperature of the antenna is too high or too low, the operating medium with a certain temperature may be driven to flow into the flow channels 811 in the first temperature control unit layer 81 and the second temperature control unit layer 82. The first temperature control unit layer 81 and the second temperature control unit layer 82 are arranged close to the phase shifter, so that the temperature of the phase shifter can be adjusted through the operating medium. Specifically, each of the first temperature control unit layer 81 and the second temperature control unit layer 82 may be a whole layer structure made of a heat conductive material, for example, metal; if the base materials of the first temperature control unit layer 81 and the second temperature control unit layer 82 each are a material with a relatively high strength, a supporting force can be provided for the antenna. The first temperature control unit layer 81 and the second temperature control unit layer 82 are tightly attached to the upper surface and the lower surface of the phase shifter, portions of surfaces of the first temperature control unit layer 81 and the second temperature control unit layer 82 contacting the phase shifter absorb the most heat, and thus, are called as cold heads of the first temperature control unit layer 81 and the second temperature control unit layer 82, respectively. The plurality of flow channels 811 are formed in each whole layer structure.

Further, the antenna may further include a circulation device 9, where the circulation device 9 is connected to the flow channels 811 of the first temperature control unit layer 81 and the second temperature control unit layer 82, and is configured to drive the operating medium to flow circularly. In some examples, the circulation device 9 may include an operating medium driving unit and an operating medium temperature control unit, the operating medium driving unit is configured to drive the operating medium to flow, such as a water-cooling pump, a motor, etc.; and the operating medium temperature control unit is configured to control a temperature of the operating medium, has heating, refrigerating and temperature control functions, and can control the temperature of the operating medium to be constant, such as constant between 25° C.±0.5° C. The circulation device 9 may be arranged outside the housing 5.

Further, when the radiation layer includes the first dielectric substrate 021, the first dielectric substrate 021 is the PCB, and the flow channels 811 in the second temperature control unit layer 82 may be attached to the PCB by using a heat conductive adhesive. When the feed layer includes a waveguide feed network, the first temperature control unit layer 81 may be disposed in the same layer as the waveguide feed network, and orthographic projections of the first temperature control unit layer and the waveguide feed network on the second dielectric substrate do not overlap with each other. The flow channels 811 of the first temperature control unit layer 81 may be obtained by machining, including cutting and washing, half flow channels 811 by a machine tool and then bonding every two half flow channels 811 together. The liquid operating medium is preferably pure water with the maximum specific heat capacity in the liquid operating mediums.

Figure 14:
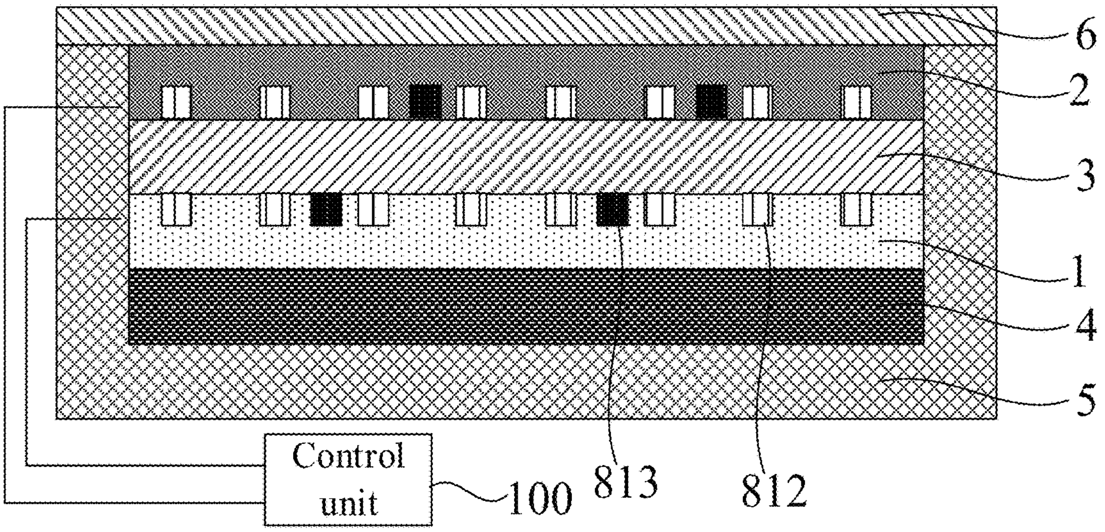
FIG. 14 is a schematic diagram of a structure of an antenna according to a second example according to an embodiment of the present disclosure.

In a second example, FIG. 14 is a schematic diagram of a structure of an antenna according to a second example according to an embodiment of the present disclosure. As shown in FIG. 14, this example is different from the first example in that the first temperature control unit layer 81 and the second temperature control unit layer 82 may include an electric heating sheet and/or a semiconductor refrigeration sheet 812. The first temperature control unit layer 81 and the second temperature control unit layer 82 may have various structures and arrangements. For example, the first temperature control unit layer 81 and the second temperature control unit layer 82 are both electric heating sheets, specifically may be resistance wires, and may be arranged linearly or spirally around the peripheries of the second openings 211 and the transmission line 11, which is not limited herein. A material of the resistance wire may be a high-resistance material, such as indium tin oxide, and is not limited herein.

In some examples, the electric heating sheet 812 may use a resistance wire heating sheet and a PTC (positive temperature coefficient) heating sheet, or a heating resistor such as an ITO material is directly fabricated on the back of the liquid crystal phase shifter; the semiconductor refrigeration sheet 812 (utilizing the Peltier effect unique to semiconductor materials) may be made of a bismuth telluride-based semiconductor material such as P-type $Bi_2Te_3$—$Sb_2Te_3$ or N-type $Bi_2Te_3$—$Bi_2Se_3$.

Further, the antenna provided by the embodiment of the present disclosure may further include a plurality of temperature measurement units 813, where the plurality of temperature measurement units 813 are disposed in at least a part of the plurality of phase shifters in the phase adjustment layer 3, and may be disposed on a side of the first substrate and/or the second substrate of each of the part of the phase shifters. That is, the plurality of temperature measurement units 813 may be disposed on a side of one of the first substrate and the second substrate close to or away from the tunable dielectric layer, and the plurality of temperature measurement units are configured to detect an operating temperature of the phase shifter, and may be, for example, a thermistor, a thermocouple, or the like.

In some examples, the antenna provided by the embodiment of the present disclosure may further include a control unit 100, the control unit 100 is connected to the temperature measurement units and the first temperature control unit layer 81 and the second temperature control unit layer 82, and the control unit 100 may control the first temperature control unit layer 81 and the second temperature control unit layer 82 to adjust the temperature of the phase shifters according to the operating temperature of the phase shifters fed back by the temperature measurement units. For example: the temperature measurement units 813 measure the temperature near the phase shifters in real time, when the temperature of the phase shifters detected by one or more temperature measurement units 813 is lowered, the temperature is fed back to the control unit 100, the control unit 100 controls the electric heating sheets 812 near the abnormal temperature points to heat and raise the temperature, until the temperature is restored to the normal operating temperature, and the heating is stopped; when the temperature of the phase shifters detected by one or more temperature measurement units 813 is lowered, the temperature is fed back to the control unit 100, and the control unit 100 controls the semiconductor refrigeration sheets 812 near the abnormal temperature point to refrigerate, until the temperature is restored to the normal operating temperature, and the refrigerating is stopped.

Figure 15:
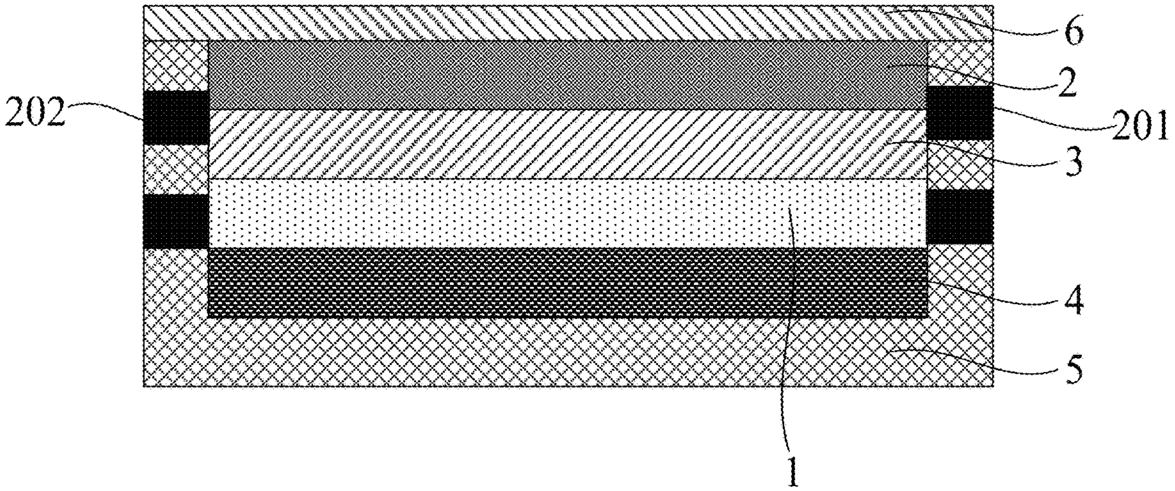
FIG. 15 is a schematic diagram of a structure of an antenna according to a third example according to an embodiment of the present disclosure.

In a third example, FIG. 15 is a schematic diagram of a structure of an antenna according to a third example according to an embodiment of the present disclosure. As shown in FIG. 15, this example is different from the first example and the second example in that the temperature of the antenna is adjusted by a wind control device mounted on the housing 5. Specifically, the housing 5 of the antenna includes at least a first side plate and a second side plate which are oppositely disposed; a first wind control device 201 is arranged on the first side plate, and a second wind control device 202 is arranged on the second side plate; the first wind control device 201 is configured to direct air from the environment into the interior of the housing 5 and the second wind control device 202 is configured to direct air from the interior of the housing 5 out of the housing 5.

Specifically, the first wind control device 201 and the second wind control device 202 may be fans. As shown in FIG. 15, each of two sides of the antenna housing 5 are provided with 2 openings, and fans are installed at the openings, the left fans sucks air in the environment from the outside of the antenna housing 5 into the antenna housing 5, and the right fans sucks air in the antenna housing 5 and discharges the air into the environment. When the temperature of the phase shifter is higher than the normal operating temperature, the control system turns on the fans, and carries the heat in the antenna system to the air by taking the rapidly flowing air as a heat exchange medium, so that the temperature of the phase shifter is maintained in the range of the normal operating temperature. In addition, a heat pump technology may be combined in this embodiment, when the antenna temperature is lower than the normal operating temperature, the control system starts a heat pump, collects the heat in the environment (generates overheated air) and blows the overheated air into the antenna housing 5 through the fans, so that the internal temperature of the antenna rises to the normal operating temperature, and then the control system turns off the heat pump and the fans.

Figure 16:
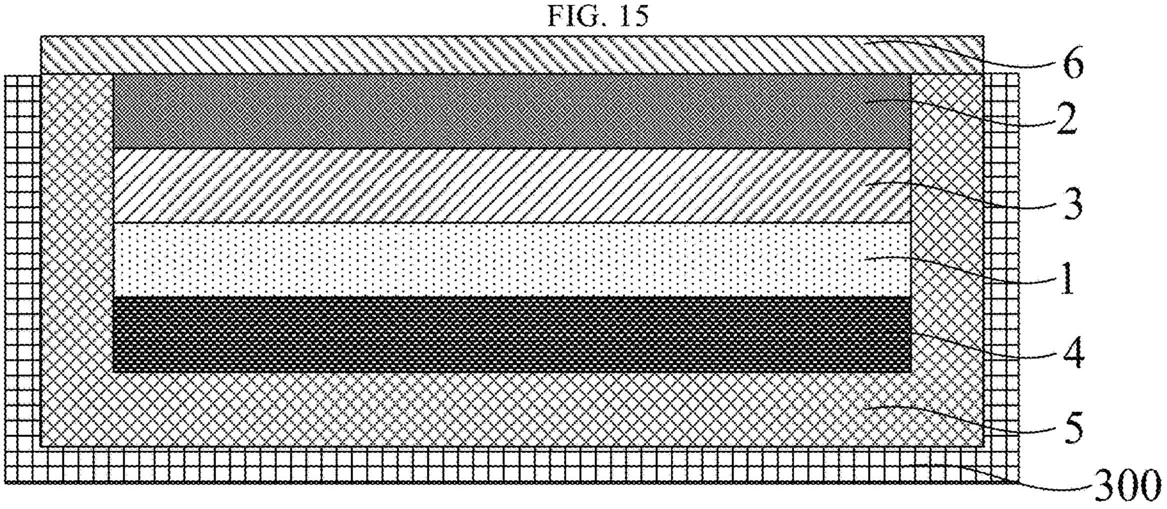
FIG. 16 is a schematic diagram of a structure of an antenna according to a fourth example according to an embodiment of the present disclosure.

In a fourth example, FIG. 16 is a schematic diagram of a structure of an antenna according to a fourth example according to an embodiment of the present disclosure. As shown in FIG. 16, this example is different from the third example in that a temperature control layer 300 is provided on an outer wall of the housing 5. The temperature control layer 300 may be a heat preservation composite film including PI/Al/$Al_2O_3$. A surface of a non-radiation surface of the antenna (namely the periphery and the bottom surface of the housing 5) is coated with a composite film including PI/Al/$Al_2O_3$ with a heat preservation effect. The first layer of PI (polyimide) film has a thickness in a range from 50 um to 125 um, and is used as a substrate, a metal Al film with a thickness in a range from 100 nm to 1 um is plated on the first layer of PI (polyimide) film through vacuum magnetron sputtering, and then an $Al_2O_3$ film with a thickness in a range from 50 nm to 300 nm is plated on the metal Al film through vacuum magnetron sputtering ($Al_2O_3$ is used as an anti-oxidation layer of the Al film). The emissivity of a surface of the Al film is extremely low, so that the heat inside the antenna can be prevented from being emitted to the environment in a heat radiation mode; the surface of the Al film has extremely high reflectivity to infrared light and visible light, and sunlight and heat radiation (infrared rays) in the environment which are emitted to the antenna housing 5 can be reflected back to the environment. The composite film plays a role in heat preservation (the heat inside the antenna is not dissipated to the environment, and the heat in the environment cannot be easily transferred to the inside of the antenna).

Alternatively, the temperature of the antenna can be controlled in such an example by combining any of the three examples. The description is not repeated here.

In a second aspect, an embodiment of the present disclosure provides an electronic device which includes the antenna.

The antenna provided by an embodiment of the present disclosure further includes a transceiver unit, a radio frequency transceiver, a signal amplifier, a power amplifier, and a filtering unit. The antenna 1 may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by the antenna in the electronic device and is processed by the filtering unit, the power amplifier, the signal amplifier and the radio frequency transceiver, the antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one antenna. In the process of transmitting signals by the antenna, the signal amplifier is used for improving a signal-to-noise ratio of the signals output by the radio frequency transceiver and then transmitting the signals to the filtering unit; the power amplifier is used for amplifying the power of the signals output by the radio frequency transceiver and then transmitting the signals to the filtering unit; the filtering unit specifically includes a duplexer and a filtering circuit, the filtering unit combines signals output by the signal amplifier and the power amplifier and filters noise waves and then transmits the signals to the antenna, and the antenna radiates the signals. In the process of receiving signals by the antenna, the signals received by the antenna are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the antenna. The signals received by the antenna are processed by the power amplifier and the signal amplifier and then transmitted to the radio frequency transceiver, and the radio frequency transceiver transmits the signals to the transceiver unit.

In some embodiments, the signal amplifier may include various types of signal amplifiers, such as a low noise amplifier, without limitation.

In some embodiments, the electronic device provided by the embodiments of the present disclosure further includes a power management unit connected to the power amplifier and for providing the power amplifier with a voltage for amplifying the signal.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. An antenna, comprising a feed layer, a phase adjustment layer, and a radiation layer, wherein the feed layer is configured to transmit a microwave signal to the phase adjustment layer;

the phase adjustment layer is configured to phase-shift the microwave signal by a preset phase shift amount; and the radiation layer is configured to radiate the microwave signal phase-shifted by the phase adjustment layer, and the radiation layer comprises at least one first radiation patch, the phase adjustment layer comprises at least one phase shifter, a first transmission end of each of the at least one phase shifter is electrically connected to a second feed port of the feed layer; a second transmission end of the phase shifter is electrically connected to one of the at least one first radiation patch; and the radiation layer further comprises a first dielectric substrate and at least one probe, and the at least one first radiation layer is arranged on a side of the first dielectric substrate away from the phase adjustment layer; each of the at least one probe is electrically connected to a corresponding first radiation layer of the at least one first radiation layer, and penetrates through the first dielectric substrate and points to the second transmission end of a corresponding phase shifter of the at least one phase shifter.

2. The antenna of claim 1, wherein the first radiation patch comprises a first side and a second side opposite to each other in a first direction, and a third side and a fourth side opposite to each other in a second direction; the first radiation patch further comprises a fifth side; and the fifth side is connected in at least one of the following manners:

between a first end of the first side and a first end of the third side;

between a second end of the first side and a first end of the fourth side;

between a first end of the second side and a second end of the third side; and between a second end of the second side and a second end of the fourth side.

3. The antenna of claim 2, wherein the fifth side is connected between the first end of the first side and the first end of the third side, an intersection point of an extension line of the first side and an extension line of the third side is a first intersection point, and a distance from the first intersection point to the first end of the first side is equal to a distance from the first intersection point to the first end of the third side; or the fifth side is connected between the second end of the first side and the first end of the fourth side, an intersection point of an extension line of the first side and an extension line of the fourth side is a second intersection point, and a distance from the second intersection point to the second end of the first side is equal to a distance from the second intersection point to the first end of the fourth side; or the fifth side is connected between the first end of the second side and the second end of the third side, an intersection point of an extension line of the second side and an extension line of the third side is a third intersection point, and a distance from the third intersection point to the first end of the second side is equal to a distance from the third intersection point to the second end of the third side; or the fifth side is connected between the second end of the second side and the second end of the fourth side, an intersection point of an extension line of the second side and an extension line of the fourth side is a fourth intersection point, and a distance from the fourth intersection point to the second end of the second side is equal to a distance from the fourth intersection point to the second end of the fourth side.

4. The antenna of claim 2, wherein the phase adjustment layer comprises at least one phase shifter, each of which comprises a first substrate and a second substrate opposite to each other, and a tunable dielectric layer between the first substrate and the second substrate; a temperature control unit layer is arranged on a side of at least one of the first substrate and the second substrate away from the tunable dielectric layer; the temperature control unit layer is configured to adjust a temperature of the phase adjustment layer to adjust an operating temperature of the antenna.

5. The antenna of claim 4, wherein the temperature control unit layer is provided with a plurality of flow channels therein for accommodating an operating medium to flow; and the antenna further comprises a circulation device connected to the plurality of flow channels;

wherein the circulation device comprises an operating medium driving unit and an operating medium temperature control unit, the operating medium driving unit is configured to drive the operating medium to flow, and the operating medium temperature control unit is configured to control an temperature of the operating medium.

6. The antenna of claim 1, wherein the first radiation patch comprises a first side and a second side opposite to each other in a first direction, and a third side and a fourth side opposite to each other in a second direction; a center of a virtual quadrangle defined by extension lines of the first side, the second side, the third side and the fourth side is a first center, and a connection node between each of the at least one probe and the corresponding first radiation patch is a first node; the first node is spaced apart from the first center by a first distance.

7. The antenna of claim 6, wherein an extending direction of a line connecting the first node and the first center is the second direction.

8. The antenna of claim 1, further comprising a first reference electrode layer between the first dielectric substrate and the phase adjustment layer; wherein the first reference electrode layer is provided with at least one first opening, and the at least one probe is in one-to-one correspondence with the at least one first opening.

9. The antenna of claim 1, wherein the antenna comprises a housing, and a temperature control layer is on an outer wall of the housing.

10. An electronic device, comprising the antenna of claim 1.

11. An antenna, comprising a feed layer, a phase adjustment layer, and a radiation layer, wherein the feed layer is configured to transmit a microwave signal to the phase adjustment layer;

the phase adjustment layer is configured to phase-shift the microwave signal by a preset phase shift amount; and the radiation layer is configured to radiate the microwave signal phase-shifted by the phase adjustment layer, and the radiation layer comprises at least one first radiation patch, wherein the phase adjustment layer comprises at least one phase shifter, each of which comprises a first substrate and a second substrate opposite to each other, and a tunable dielectric layer between the first substrate and the second substrate; a temperature control unit layer is arranged on a side of at least one of the first substrate and the second substrate away from the tunable dielectric layer; the temperature control unit layer is configured to adjust a temperature of the phase adjustment layer to adjust an operating temperature of the antenna;

wherein the temperature control unit layer is provided with a plurality of flow channels therein for accommodating an operating medium to flow.

12. The antenna of claim 11, further comprising a circulation device connected to the plurality of flow channels;

wherein the circulation device comprises an operating medium driving unit and an operating medium temperature control unit, the operating medium driving unit is configured to drive the operating medium to flow, and the operating medium temperature control unit is configured to control an temperature of the operating medium.

13. The antenna of claim 11, wherein the feed layer comprises a waveguide power division feed network; the temperature control unit layer on a side of the first substrate away from the tunable dielectric layer is in a same layer as the waveguide power division feed network, and orthographic projections of the temperature control unit layer and the waveguide power division feed network on the first dielectric substrate do not overlap with each other.

14. The antenna of claim 11, wherein the temperature control unit layer comprises an electronic-heating sheet and/or a semiconductor cooling sheet.

15. The antenna of claim 11, further comprising a plurality of temperature measurement units on a side of the first substrate and/or the second substrate of at least a part of the at least one phase shifter away from the tunable dielectric layer, to detect an operating temperature of the part of the at least one phase shifter.

16. An antenna, comprising a feed layer, a phase adjustment layer, and a radiation layer, wherein the feed layer is configured to transmit a microwave signal to the phase adjustment layer;

the phase adjustment layer is configured to phase-shift the microwave signal by a preset phase shift amount; and the radiation layer is configured to radiate the microwave signal phase-shifted by the phase adjustment layer, and the radiation layer comprises at least one first radiation patch, the antenna further comprises a housing, wherein the housing comprises at least a first side plate and a second side plate opposite to each other; a first wind control device is provided on the first side plate, and a second wind control device is provided on the second side plate; the first wind control device is configured to direct ambient air inside the housing and the second wind control device is configured to direct air inside the housing out of the housing.

* * * * *